(12) United States Patent
Okubo et al.

(10) Patent No.: US 9,821,745 B2
(45) Date of Patent: Nov. 21, 2017

(54) SEATBELT DEVICE

(71) Applicant: KABUSHIKI KAISHA TOKAI-RIKA-DENKI-SEISAKUSHO, Aichi (JP)

(72) Inventors: Shinichi Okubo, Aichi (JP); Haruhiko Hashimoto, Aichi (JP); Masaru Ukita, Aichi (JP); Takahiro Hamada, Aichi (JP); Tomonari Umakoshi, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 0 days.

(21) Appl. No.: 15/030,733

(22) PCT Filed: Oct. 17, 2014

(86) PCT No.: PCT/JP2014/077733
§ 371 (c)(1),
(2) Date: Apr. 20, 2016

(87) PCT Pub. No.: WO2015/060220
PCT Pub. Date: Apr. 30, 2015

(65) Prior Publication Data
US 2016/0250987 A1    Sep. 1, 2016

(30) Foreign Application Priority Data

Oct. 23, 2013 (JP) ................................ 2013-220503

(51) Int. Cl.
*B60R 21/18* (2006.01)
*D03D 1/00* (2006.01)
(Continued)

(52) U.S. Cl.
CPC ............ *B60R 21/18* (2013.01); *B60R 21/233* (2013.01); *B60R 22/12* (2013.01); *B60R 22/14* (2013.01);
(Continued)

(58) Field of Classification Search
CPC ......... B60R 21/18; B60R 22/12; B60R 22/14; D03D 1/02
See application file for complete search history.

(56) References Cited

U.S. PATENT DOCUMENTS 3,866,940 A * 2/1975 Lewis ..................... B60R 21/18
280/733
3,888,503 A * 6/1975 Hamilton ................ B60R 21/18
280/733
(Continued)

FOREIGN PATENT DOCUMENTS

JP     2003-510469 A     3/2003
JP     2005-239055 A     9/2005
(Continued)

OTHER PUBLICATIONS

International Search Report issued in a corresponding application PCT/JP2014/077733 dated Jan. 13, 2015.

*Primary Examiner* — Barry Gooden, Jr.
(74) *Attorney, Agent, or Firm* — Roberts Mlotkowski; Safran Cole & Calderon P.C.

(57) ABSTRACT

A seatbelt device is provided with a webbing and a bag body. The webbing is applied to the body of a vehicle occupant. The bag body includes a first layer at a webbing side and a second layer at an opposite side from the webbing, with the first layer disposed therebetween. The bag body is provided along a length direction of the webbing, fixed to one side of a thickness direction of the webbing and supported by the webbing, and disposed between the webbing and the body of the vehicle occupant in a state in which the webbing is
(Continued)

applied to the body of the vehicle occupant. The bag body is inflated by fluid being supplied thereinside. A joined portion at which the first layer and second layer are locally joined together is formed in the bag body. The inflation of the bag body is controlled by the joined portion.

4 Claims, 8 Drawing Sheets

(51) Int. Cl.
  *D03D 1/02* (2006.01)
  *B60R 22/14* (2006.01)
  *D03D 11/00* (2006.01)
  *B60R 21/233* (2006.01)
  *B60R 22/12* (2006.01)
  *B60R 21/00* (2006.01)
  *B60R 21/235* (2006.01)

(52) U.S. Cl.
  CPC ............ *D03D 1/00* (2013.01); *D03D 1/0005* (2013.01); *D03D 1/02* (2013.01); *D03D 11/00* (2013.01); *B60R 2021/0032* (2013.01); *B60R 2021/0044* (2013.01); *B60R 2021/0058* (2013.01); *B60R 2021/23308* (2013.01); *B60R 2021/23509* (2013.01)

(56) References Cited

U.S. PATENT DOCUMENTS

| | | | |
|---|---|---|---|
| 4,941,710 A * | 7/1990 | Baymak | B60R 22/16 297/471 |
| 5,282,648 A | 2/1994 | Peterson | |
| 5,466,002 A * | 11/1995 | Tanaka | B60R 21/01 280/733 |
| 2005/0077708 A1* | 4/2005 | Sollars, Jr. | D03D 1/02 280/729 |
| 2005/0189749 A1 | 9/2005 | Itaoga et al. | |
| 2006/0012159 A1 | 1/2006 | Kore | |
| 2007/0080526 A1 | 4/2007 | Itoga | |
| 2008/0042413 A1* | 2/2008 | Coleman | D03D 1/02 280/743.1 |
| 2009/0051150 A1 | 2/2009 | Murakami | |
| 2011/0006507 A1* | 1/2011 | Fukawatase | B60R 21/18 280/733 |
| 2011/0204605 A1* | 8/2011 | Rathmann-Ramlow | B60R 21/18 280/733 |
| 2014/0007764 A1* | 1/2014 | Ruschulte | F25J 3/067 92/96 |
| 2016/0236641 A1* | 8/2016 | Okubo | B60R 21/18 |

FOREIGN PATENT DOCUMENTS

| | | |
|---|---|---|
| JP | 2006-27563 A | 2/2006 |
| JP | 2007-210420 A | 8/2007 |
| JP | 2013-28241 A | 2/2013 |

* cited by examiner

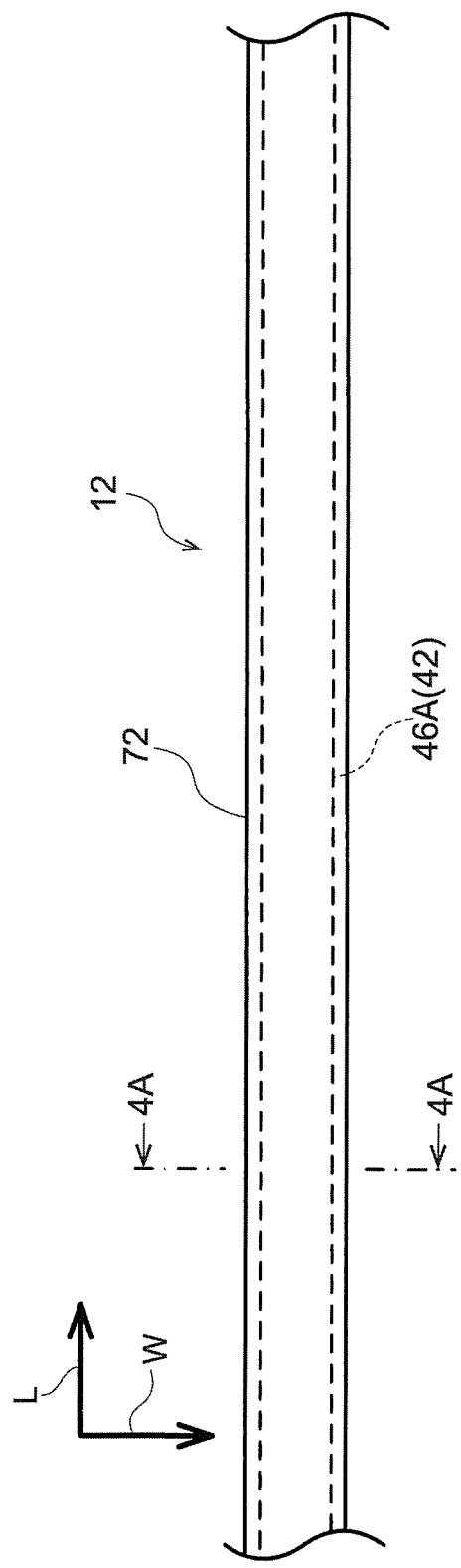

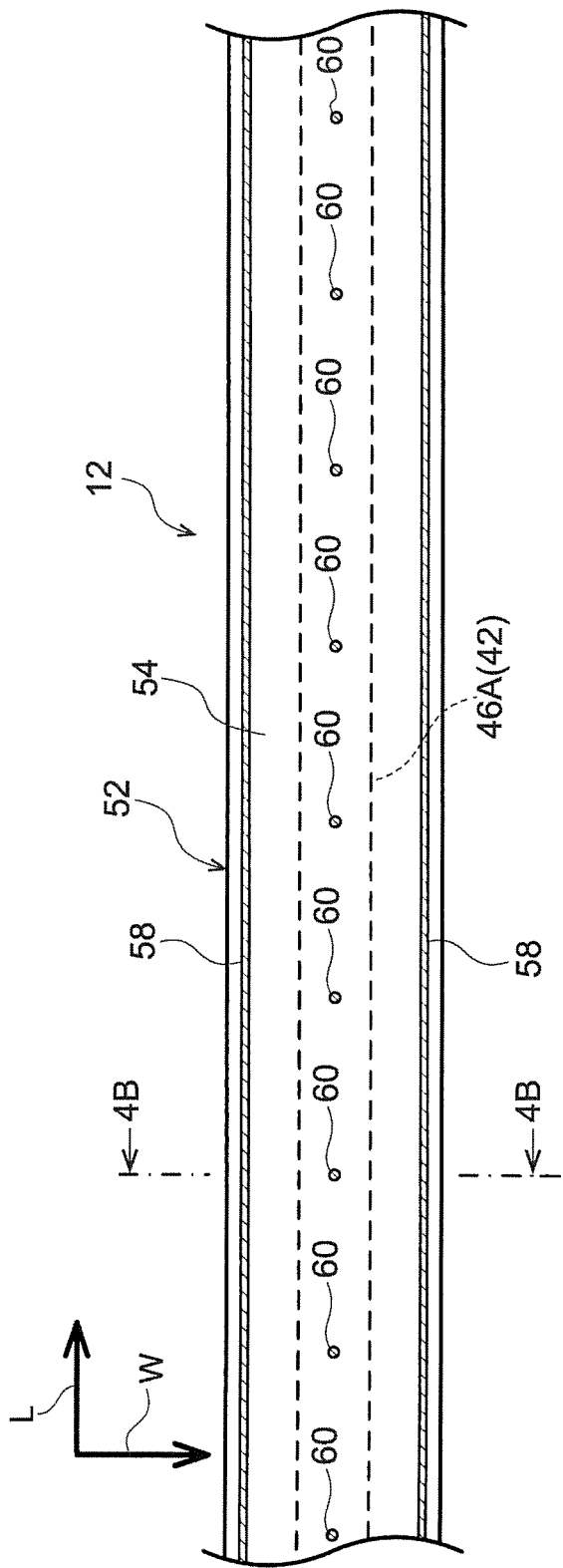

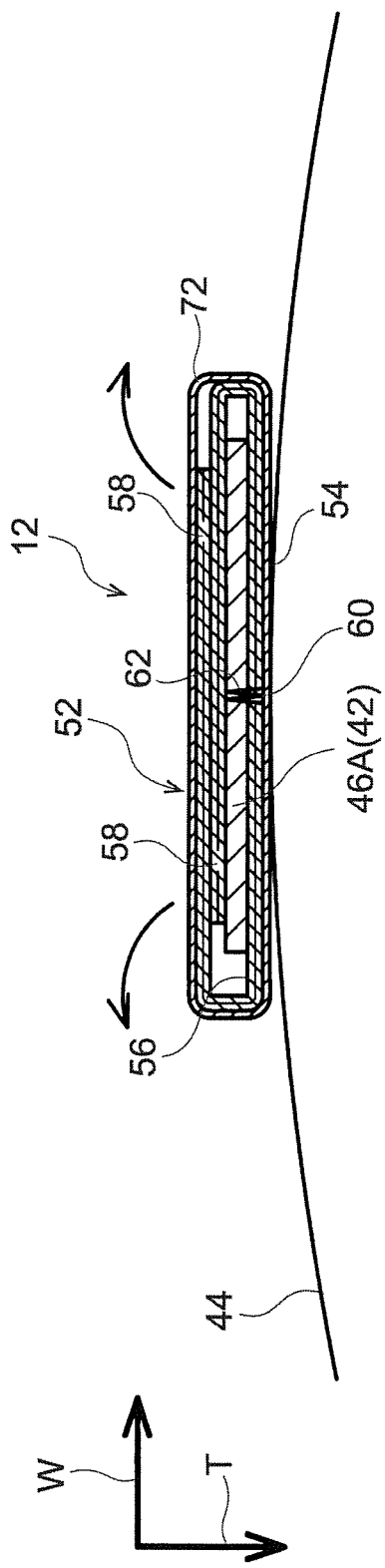

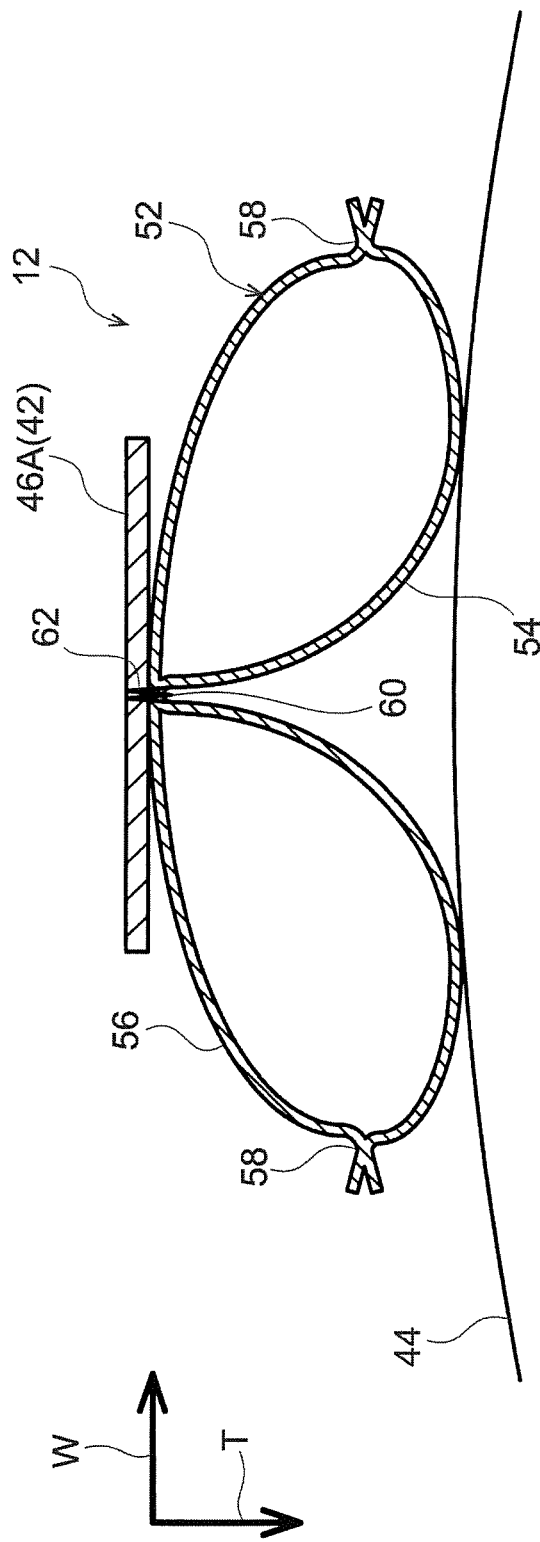

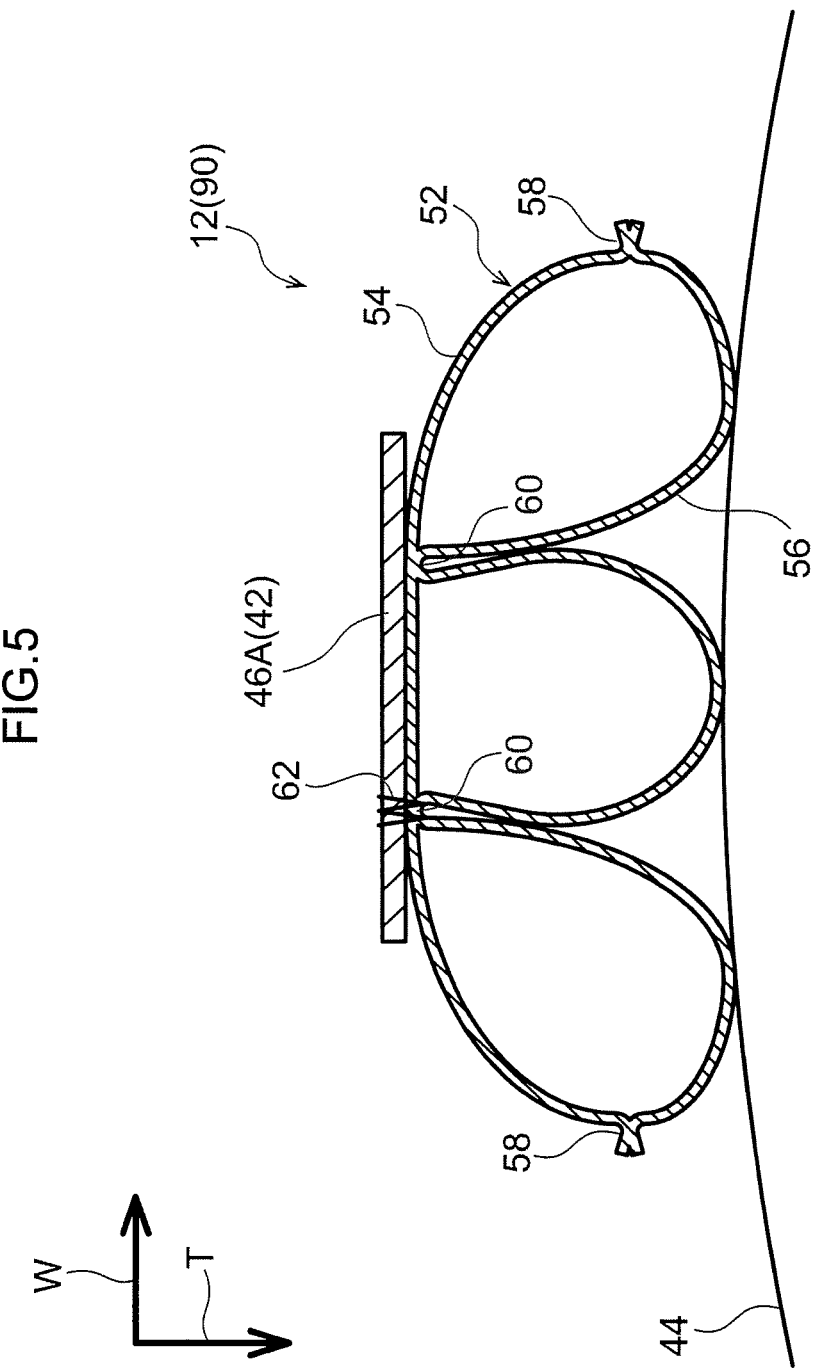

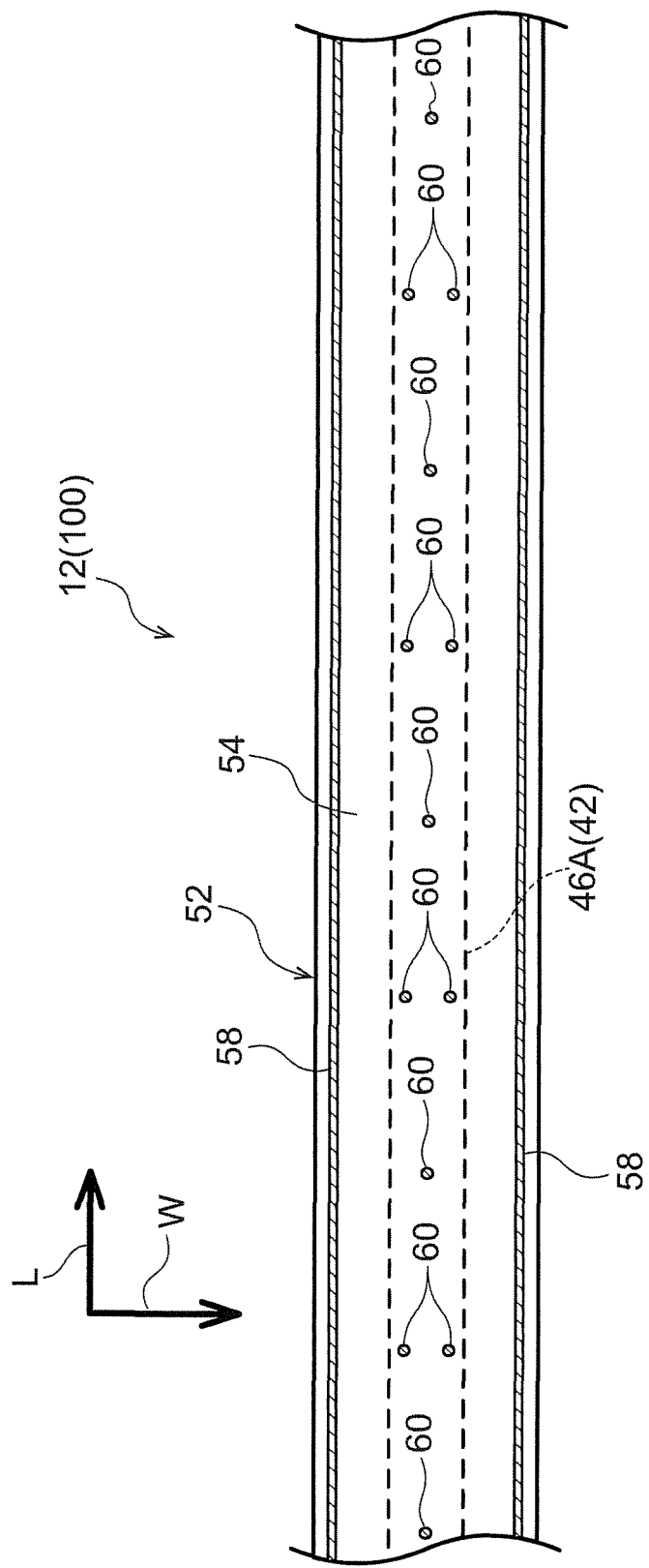

SEATBELT DEVICE

CROSS-REFERENCE TO RELATED APPLICATIONS

The present application is a U.S. National Phase of PCT/JP2014/077733 filed on Oct. 17, 2014 claiming priority to Japanese Patent application No. 2013-220503 filed Oct. 23, 2013. The disclosure of the PCT Application is hereby incorporated by reference into the present Application.

TECHNICAL FIELD

The present invention relates to a seatbelt device equipped with a bag body that inflates and expands at a time of emergency.

BACKGROUND ART

There is a seatbelt device in which a webbing is divided in two in a length direction and a bag body is provided at a location between the divided webbing. When there is a vehicle collision, gas is supplied to the bag body and the bag body inflates and expands at the front side of the body of a vehicle occupant. A portion of the bag body of this seatbelt device at the side of the bag body at which the occupant is disposed and a portion of the bag body at an opposite side from the occupant are joined by a tether. An inflated shape and the like of the bag body are controlled by the tether (for example, see Japanese Patent Application Laid-Open (JP-A) No. 2013-28241).

Between the webbing that is divided in two, only the bag body is subjected to tension applied from the webbing. Therefore, in a state in which a pretensioner device, a force limiter mechanism or the like structuring the seatbelt device is activated, the bag body is stretched or compressed in accordance with increases and reductions in tension applied to the webbing. This causes variations in tension in the webbing. Thus, the tension of the webbing may not be stable.

SUMMARY OF INVENTION

Technical Problem

In consideration of the circumstances described above, an object of the present invention is to provide a seatbelt device that mitigates the effects of an inflated bag body on tension in a webbing.

Solution to Problem

A seatbelt device according to a first aspect of the present invention includes: a webbing that is configured to be applied to the body of a vehicle occupant; and a bag body that includes a first layer at a side of the bag body at which the webbing is disposed and a second layer at an opposite side of the bag body from the webbing, the first layer being disposed between the webbing and the second layer. The bag body is provided along a length direction of the webbing, is fixed to one side of a thickness direction of the webbing, and is supported by the webbing. The bag body is disposed between the webbing and the body of the vehicle occupant in a state in which the webbing is applied to the body of the vehicle occupant, and is inflated by a fluid being supplied thereinside. A joined portion at which the first layer and the second layer are locally joined together is formed in the bag body, and the inflation of the bag body is controlled by the joined portion.

In the seatbelt device according to the first aspect, in a state in which the webbing is applied to the body of the vehicle occupant, the bag body is disposed between the body of the vehicle occupant and the webbing, and the bag body is inflated if the fluid is supplied inside the bag body. Because the bag body is provided along the length direction of the webbing, tension in the webbing, that is caused by the pretensioner load, the force limiter load or the like, is born by the webbing itself. Therefore, tension in the webbing is not affected by the inflated bag body.

In a seatbelt device according to a second aspect of the present invention, in the seatbelt device according to the first aspect, a fixed portion of the bag body to the webbing is established at the joined portion.

In the seatbelt device according to the second aspect, because the fixed portion of the bag body to the webbing is established at the joined portion between the first layer and the second layer of the bag body, formation of the fixed portion and the joined portion is simple.

In a seatbelt device according to a third aspect of the present invention, in the seatbelt device according to the first aspect or the second aspect, the bag body is formed in a bag shape or a tube shape of a double cloth including the first layer and the second layer, and the joined portion is formed by the double cloth being locally formed into a single cloth.

In the seatbelt device according to the third aspect, because the bag body is formed of a double cloth, the bag body can be formed in a bag shape or tube shape with the two layers, the first layer and the second layer, in a weaving process. Moreover, because the joined portion is formed by the double cloth being locally formed into a single cloth, the joined portion is formed in the weaving process.

In a seatbelt device according to a fourth aspect of the present invention, in the seatbelt device according to the second aspect or the third aspect, the joined portion is plurally established, and the plural joined portions are established to be spaced apart in a length direction of the bag body and offset in a width direction of the bag body.

In the seatbelt device according to the fourth aspect, the plural joined portions are provided at the bag body. These joined portions are established to be spaced apart in the length direction of the bag body and established to be offset in the width direction of the bag body. Therefore, even when, for example, the webbing and the bag body are taken up from a length direction one side thereof, the joined portions are unlikely to overlap in the take-up direction of the bag body. Thus, a thickness of the webbing and the bag body in a take-up diametric direction may be dispersed in a take-up axis direction.

In a seatbelt device according to a fifth aspect of the present invention, in the seatbelt device according to any one of the first to fourth aspects, the joined portion is provided at least at a substantially central portion in a width direction of the bag body.

In the seatbelt device according to the fifth aspect, the joined portion is provided at least at the substantially central portion of the width direction of the bag body. Therefore, displacement with inflation when the bag body is being inflated is controlled, and shifting of the bag body relative to the webbing is prevented or suppressed.

As described above, a seatbelt device according to the present invention may mitigate the effects of an inflated bag body on tension in a webbing.

BRIEF DESCRIPTION OF DRAWINGS

FIG. 3A is a view in which a webbing assembly of the seatbelt device in accordance with the first exemplary embodiment is seen from a thickness direction one side, showing a state in which a webbing and the bag body are covered by a cover.

FIG. 3B is a view in which the webbing assembly of the seatbelt device in accordance with the first exemplary embodiment is seen from the thickness direction one side, showing a state in which the bag body is expanded.

FIG. 4A is a sectional view, taken along line 4A-4A of FIG. 3A, of the webbing assembly of the seatbelt device in accordance with the first exemplary embodiment.

FIG. 4B is a sectional view, taken along line 4B-4B of FIG. 3B, of the webbing assembly of the seatbelt device in accordance with the first exemplary embodiment in a state in which the bag body has been inflated and expanded.

FIG. 5 is a sectional view, corresponding to FIG. 4B, of a webbing assembly of a seatbelt device in accordance with a second exemplary embodiment.

FIG. 6 is a view corresponding to FIG. 3B in which a webbing assembly of a seatbelt device in accordance with a third exemplary embodiment is seen from the thickness direction one side.

DESCRIPTION OF EMBODIMENTS

Figure 1:
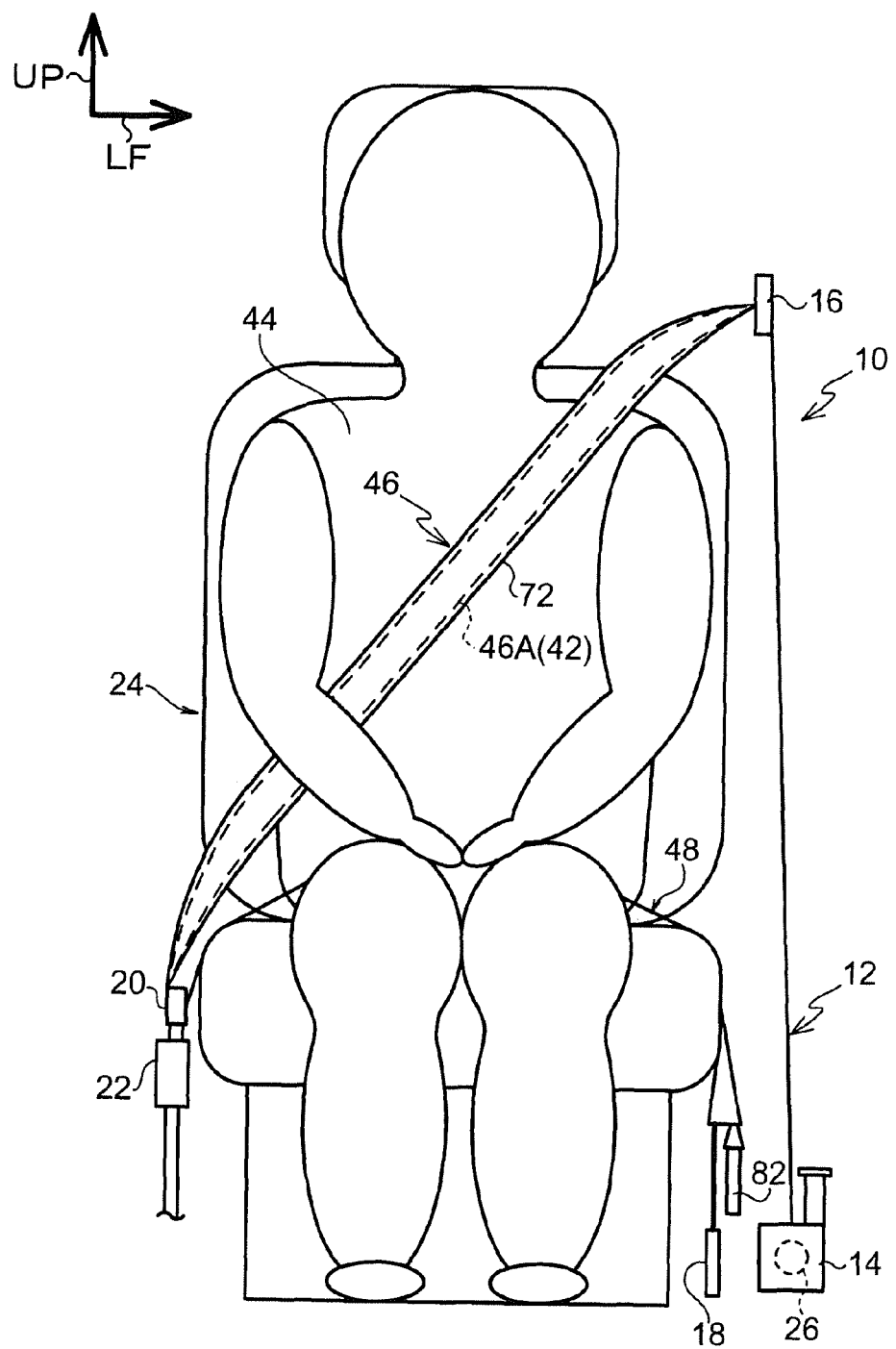
FIG. 1 is a front view of a seat at which a seatbelt device in accordance with a first exemplary embodiment is employed.
Figure 2:
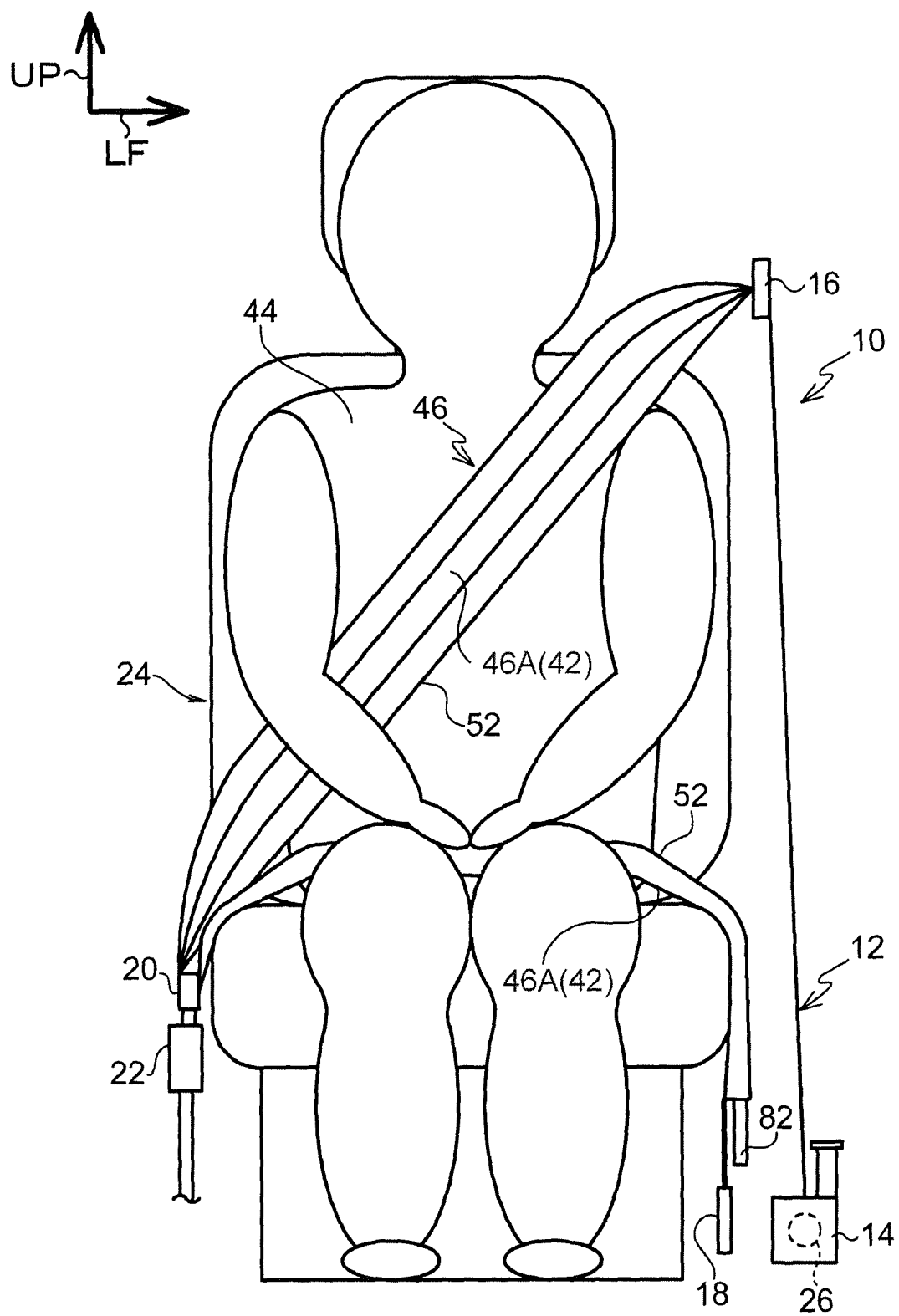
FIG. 2 is a front view, corresponding to FIG. 1, showing a state in which a bag body is inflated and expanded.

Exemplary Embodiments of the present invention are described in accordance with FIG. 1 to FIG. 6. In FIG. 1 and FIG. 2, the arrow LH indicates the left side of a vehicle in which a seatbelt device 10 is employed, and arrow UP indicates the upper side of the vehicle in which the seatbelt device 10 is employed.

In FIG. 3 to FIG. 6, the arrow L indicates a length direction distal end side of a webbing assembly 12, arrow W indicates a width direction one side of the webbing assembly 12, and arrow T indicates a thickness direction one side of the webbing assembly 12.

Seatbelt devices 10, 90 and 100 according to respective exemplary embodiments are employed at a seat 24 at the vehicle front-left side (that is, a driver seat in a left hand drive vehicle or an assistant driver seat in a right hand drive vehicle). Therefore, when the seatbelt device 10, 90 or 100 is employed at another seat that is not the seat 24 at the vehicle front-left side, such as the seat at the vehicle front-right side or the like, the structures of the seatbelt device 10, 90 or 100 are provided with left and right switched.

Structures of a First Exemplary Embodiment

Overall Structure of the Seatbelt Device 10

As shown in FIG. 1, the seatbelt device 10 is structured to include the webbing assembly 12, a webbing take-up device 14, a shoulder belt anchor 16, an anchor plate 18, a tongue 20 and a buckle 22.

The webbing take-up device 14 is provided at the vehicle lower-left side of the seat 24 and is fixed to the vehicle body. A spool 26 is provided at the webbing take-up device 14. The spool 26 is supported at a frame of the webbing take-up device 14 to be rotatable with a central axis direction thereof in the vehicle front-and-rear direction. A webbing 42 in a long, narrow shape structures the webbing assembly 12. A length direction proximal end side of the webbing 42 is anchored at the spool 26. The length direction proximal end side of the webbing assembly 12 is taken up onto the spool 26.

The webbing take-up device 14 is also provided with a lock mechanism, which is not shown in the drawings. The lock mechanism activates at a time of emergency, such as when there is a vehicle collision or the like. When the lock mechanism activates, rotation of the spool 26 in a pull-out direction, which is opposite to the take-up direction, is restricted by the lock mechanism. The webbing take-up device 14 is also provided with a pretensioner device, which is not shown in the drawings. The pretensioner device activates at a time of emergency, such as when there is a vehicle collision or the like. When the pretensioner device activates, the spool 26 is turned in the take-up direction. As a result, the webbing 42 is pulled toward the length direction proximal end side thereof by a predetermined pretensioner load.

The webbing take-up device 14 is equipped with a force limiter mechanism, which is not shown in the drawings. The force limiter mechanism is structured to include an energy-absorbing member such as, for example, a torsion shaft or the like that is provided inside the spool 26 to be coaxial with the spool 26. In a state in which the above-mentioned lock mechanism has activated, if the tension load pulling on the webbing 42 exceeds a force limiter load, which is a mechanical strength of the energy-absorbing member, the energy-absorbing member deforms. Hence, the spool 26 turns in the pull-out direction by an amount corresponding to the deformation of the energy-absorbing member, and the webbing 42 is pulled out from the spool 26. The body of a vehicle occupant 44 is allowed to move by inertia toward the vehicle front side in accordance with this pull-out amount of the webbing 42, and a portion of a tension force with which the body of the vehicle occupant 44 is pulling on the webbing 42 is absorbed in association with the deformation of the energy-absorbing member.

The shoulder belt anchor 16 is attached to a center pillar, which is an aspect of a side wall of the vehicle, at the vehicle upper side of the webbing take-up device 14. The webbing assembly 12 is pulled out toward the vehicle upper side from the spool 26 of the webbing take-up device 14, passes through a slit hole formed in the shoulder belt anchor 16, and is folded back toward the vehicle lower side. The anchor plate 18 is fixed to the vehicle body or a frame of the seat 24 at the vehicle lower-left side of the seat 24. A length direction distal end of the webbing 42 of the webbing assembly 12 that has been folded back at the shoulder belt anchor 16 is anchored at the anchor plate 18.

The buckle 22 is provided at the vehicle right side of the seat 24. The buckle 22 is fixed to the vehicle body, the frame of the seat 24 or the like. The tongue 20 is provided between the shoulder belt anchor 16 and the anchor plate 18 of the webbing assembly 12. The webbing assembly 12 passes through a slit hole formed in the tongue 20. Consequently, the tongue 20 may be moved along the webbing assembly 12. When the tongue 20 is inserted into an aperture portion for insertion of the tongue 20 that is formed in an upper end of the buckle 22, a latch of the buckle 22 penetrates through a penetrating hole formed in the tongue 20. Hence, the tongue 20 is retained by the buckle 22.

Structure of the Webbing Assembly 12

As shown in FIG. 3A to FIG. 4B, the webbing assembly 12 is provided with the webbing 42 and a bag body 52. The bag body 52 is formed in a long, narrow shape and is provided along the length direction of the webbing 42 at a thickness direction one side of the webbing 42. As shown in FIG. 1, when the webbing assembly 12 is wound round the body of the vehicle occupant 44 and the tongue 20 is retained at the buckle 22, the webbing assembly 12 is in an applied state. In this state, a portion of the webbing assembly 12 disposed between the tongue 20 and the shoulder belt anchor 16 serves as a shoulder portion 46. The shoulder portion 46 is applied to a region of the body of the vehicle occupant 44 extending from the left shoulder to a portion at the right side of the waist. The bag body 52 is disposed at the shoulder portion 46 between the webbing 42 and the body of the vehicle occupant 44. In the applied state, a portion of the webbing assembly 12 disposed between the tongue 20 and the anchor plate 18 serves as a lap portion 48. The lap portion 48 is applied to the waist area of the vehicle occupant 44.

The bag body 52 has a two-layer structure provided with a first layer 54 and a second layer 56, each of which is in a belt shape. As shown in FIG. 4B, when the bag body 52 expands as described below, the first layer 54 opposes the webbing 42 at the thickness direction one side of the webbing 42 and the second layer 56 is disposed at an opposite side of the first layer 54 from the side thereof at which the webbing 42 is disposed. As shown in FIG. 3B, a binding portion 58 is formed at each of two width direction end sides of the bag body 52. Each binding portion 58 is formed in a cord shape that is long in the length direction of the bag body 52. At portions at which the binding portions 58 are formed, the bag body 52 has a one-layer structure in which the first layer 54 and second layer 56 are not divided. Although each binding portion 58 is formed in a cord shape in the present exemplary embodiment, the whole of the two width direction end sides of the bag body 52 relative to the first layer 54 and second layer 56 may serve as the binding portions 58.

As shown in FIG. 3B, a plural number of middle binding portions 60 are formed between the binding portions 58 of the bag body 52 to serve as a joined portion. The middle binding portions 60 are formed to correspond with portions of a shoulder webbing 46A of the webbing 42. The middle binding portions 60 are formed at suitable intervals in the length direction of the bag body 52. In portions at which the middle binding portions 60 are formed, the bag body 52 has a one-layer structure in which the portions are not divided into the first layer 54 and second layer 56. As shown in FIG. 4B, each middle binding portion 60 of the bag body 52 is stitched and fixed to the webbing 42 by a stitching thread 62.

The bag body 52 is woven of a double cloth into a bag shape or tube shape of which a length direction distal end is open. The binding portions 58 and middle binding portions 60 of the bag body 52 are structured by binding threads that are one or both of a warp and a weft that form the bag body 52. Therefore, portions of the bag body 52 that are divided into two layers, the first layer 54 and the second layer 56, and one-layer portions (single-cloth portions) of the bag body 52, the binding portions 58 and the middle binding portions 60, can be formed in a weaving process.

As shown in FIG. 3B, the bag body 52 is formed with a width dimension in an expanded state thereof that is larger than a width dimension of the webbing 42. As shown in FIG. 4A, in a state in which the webbing assembly 12 is applied to the body of the vehicle occupant 44, the width direction middle side of the bag body 52 at the shoulder portion 46 is disposed between the webbing 42 and the body of the vehicle occupant 44. As shown in FIG. 4A, the two width direction end sides of the bag body 52 are folded back and folded round to the thickness direction other side of the webbing 42. As shown in FIG. 3A and FIG. 4A, in a state in which the bag body 52 is folded round so as to enclose the webbing 42, the bag body 52 is covered by a cover 72 in a tube shape or bag shape.

As shown in FIG. 1, an inflator 82 that serves as a fluid supply device is mounted at an end portion of the bag body 52 at the side thereof at which the anchor plate 18 is disposed. The inflator 82 is electronically connected with an ECU that serves as a control device. The ECU is electronically connected to collision detection sensors such as load detection sensors, acceleration sensors and the like that are provided at the vehicle body. When a collision of the vehicle is detected by the collision detection sensors, the ECU activates the inflator 82.

Operation and Effects of the First Exemplary Embodiment

In the present seatbelt device 10, the tongue 20 is gripped and pulled on by the vehicle occupant 44 sitting on the seat 24. As a result, the webbing assembly 12 is pulled out from the spool 26 of the webbing take-up device 14 and wound round the body of the vehicle occupant 44 from the front side thereof. In this state, the tongue 20 is inserted into and retained at the buckle 22 and, as shown in FIG. 1, the webbing assembly 12 is applied to the body of the vehicle occupant 44.

In the event that the vehicle has a collision in this state, the lock mechanism provided at the webbing take-up device 14 activates. Thus, rotation of the spool 26 of the webbing take-up device 14 in the pull-out direction is restricted by the lock mechanism. Consequently, the body of the vehicle occupant 44 is restrained by the webbing 42 and inertial movement towards the vehicle front side is restricted. Further when the vehicle collides, the pretensioner device of the webbing take-up device 14 activates and the spool 26 of the webbing take-up device 14 is turned in the take-up direction by the pretensioner device. Consequently, the webbing 42 is pulled toward the length direction proximal end side thereof by a predetermined pretensioner load and the body of the vehicle occupant 44 is restrained with stronger force.

In addition in this state, when the collision of the vehicle is detected by the collision detection sensors, the ECU activates the inflator 82. As a result, gas is produced by the inflator 82. The gas produced by the inflator 82 is supplied into the bag body 52 from the side of the bag body 52 at which the anchor plate 18 is disposed, and the bag body 52 is inflated and expanded by pressure of this gas. When the bag body 52 inflates and expands thus, the cover 72 covering the bag body 52 is ruptured.

At the shoulder portion 46 of the webbing assembly 12, the inflated and expanded bag body 52 is interposed between the webbing 42 and the body of the vehicle occupant 44. Therefore, a load from the body of the vehicle occupant 44 acting to move by inertia toward the vehicle front side is supported by the webbing 42 via the bag body 52. Therefore, inertial movement of the body of the vehicle occupant 44 may be restrained effectively. In addition, a portion of a load that the body of the vehicle occupant 44 experiences from the vehicle front side at this time is absorbed and moderated by the inflated and expanded bag body 52. Moreover, because the width dimension of the inflated and expanded bag body 52 is larger than that of the webbing 42, the load from the body of the vehicle occupant 44 may be borne over a larger area than the webbing 42, and the load experienced by the body of the vehicle occupant 44 per unit of area may be moderated.

In this state, if the webbing 42 is pulled on with a force exceeding the force limiter load by the body of the vehicle occupant 44 acting to move by inertia toward the vehicle front side, the force limiter mechanism provided at the webbing take-up device 14 activates. When the force limiter mechanism activates, the energy-absorbing member of the force limiter mechanism is deformed by the tension load applied to the webbing 42. The spool 26 of the webbing take-up device 14 is turned in the pull-out direction by an amount corresponding to the deformation of the energy-absorbing member, and the webbing 42 is pulled out from the spool 26. In accordance with a pull-out amount of the webbing 42, the body of the vehicle occupant 44 may move by inertia toward the vehicle front, in addition to which a portion of the tension force with which the body of the vehicle occupant 44 pulls on the webbing 42 is absorbed in association with the deformation of the energy-absorbing member.

At the shoulder portion 46, the bag body 52 is sandwiched between the webbing 42 and the body of the vehicle occupant 44, and the load from the body of the vehicle occupant 44 is supported by the webbing 42. Even if tension in the webbing 42 caused by the load from the body of the vehicle occupant 44 increases, deformation such that the webbing 42 stretches in the length direction thereof is unlikely to occur. Because the bag body 52 is fixed to and supported by the webbing 42, when the bag body 52 inflates, the pretensioner load and the force limiter load are stably transmitted from the webbing 42 to the vehicle occupant 44 via the bag body 52. Therefore, effects of the inflated bag body 52 on the webbing 42 are slight.

Because the bag body 52 is fixed to the webbing 42 at the middle binding portions 60, when the bag body 52 is inflating, inflation positions are restricted. Consequently, shifting of the bag body 52 relative to the webbing 42 may be prevented or suppressed. Therefore, the vehicle occupant 44 may be reliably held by the webbing 42 via the bag body 52. In addition, because the bag body 52 at the shoulder portion 46 is sandwiched and retained between the webbing 42 and the body of the vehicle occupant 44, even if fixed portions of the bag body 52 to the webbing 42 such as the middle binding portions 60 are reduced in number, shifting of the bag body 52 relative to the webbing 42 may be prevented or suppressed.

At the middle binding portions 60, the bag body 52 is not divided into the first layer 54 and second layer 56 but is structured as a single layer. Therefore, as shown in FIG. 4B, the bag body 52 is not inflated at the middle binding portions 60 but is inflated at the two width direction sides of the middle binding portions 60. A cross-sectional shape of the bag body 52 whose inflation is controlled in this manner is formed into a flattened shape that is narrow in the thickness direction, and touches against the body of the vehicle occupant 44 at the two width direction sides relative to the middle binding portions 60. Therefore, even when the bag body 52 is subjected to a load from the body of the vehicle occupant 44, the bag body 52 does not swivel or displace from the webbing 42. Thus, the bag body 52 may touch against the body of the vehicle occupant 44 stably.

In a case of a structure in which the bag body 52 is fixed to the webbing 42 at positions other than the middle binding portions 60 that join together the first layer 54 and second layer 56 of the bag body 52, the first layer 54 and second layer 56 must be locally joined together for inflation control of the bag body 62, in addition to which the bag body 52 must be fixed to the webbing 42. In contrast to that structure, in the present exemplary embodiment the first layer 54 and second layer 56 of the bag body 52 and the webbing 42 may be joined together and fixed by a single seam at the middle binding portions 60. Thus, fabrication is simple.

In a structure in which the bag body 52 is fixed to the webbing 42 at positions other than the middle binding portions 60 that join together the first layer 54 and second layer 56 of the bag body 52, the fixed portions of the bag body 52 to the webbing 42 that are separate from the middle binding portions 60 may affect inflation of the bag body 52. In contrast, in the present exemplary embodiment, because the bag body 52 is fixed to the webbing 42 at the middle binding portions 60 that control the inflation of the bag body 52, the fixed portions of the bag body 52 to the webbing 42 do not have unnecessary effects on the inflation of the bag body 52. Thus, the inflation of the bag body 52 may be excellently controlled.

In the present exemplary embodiment, the webbing 42 and the bag body 52 are stitched together at the middle binding portions 60 that have a one-layer structure. Therefore, when the gas is supplied and the bag body 52 is inflated, the gas does not leak through the portions of the bag body 52 that are stitched by the stitching thread 62. Therefore, pressure of the gas may efficiently contribute to the inflation of the bag body 52.

In the present exemplary embodiment, because the bag body 52 is woven of a double cloth, portions in which the bag body 52 is divided into two layers, the first layer 54 and the second layer 56, and portions in which the bag body 52 is a single layer, the binding portions 58 and the middle binding portions 60, may be formed in the process of weaving.

Second Exemplary Embodiment

Now, a second exemplary embodiment is described. In the following descriptions of each exemplary embodiment, portions that are basically the same as in a preceding exemplary embodiment are assigned the same reference symbols and descriptions thereof may be omitted.

As shown in FIG. 5, in the webbing assembly 12 of the present seatbelt device 90, the middle binding portions 60 are established at two locations spaced apart in the width direction of the bag body 52. Therefore, the bag body 52 inflates at regions at the width direction outer sides relative to the two sets of middle binding portions 60 and at a region between the two sets of middle binding portions 60. The bag body 52 that inflates in this manner touches against the body of the vehicle occupant 44 at three locations, the region between the two sets of middle binding portions 60 and the regions at the width direction outer sides relative to the two sets of middle binding portions 60. Therefore, even when the bag body 52 is subjected to a load from the body of the vehicle occupant 44, the bag body 52 does not swivel or displace from the webbing 42. Thus, the bag body 52 may touch against the body of the vehicle occupant 44 stably.

Third Exemplary Embodiment

As shown in FIG. 6, in the webbing assembly 12 of the present seatbelt device 100 according to the third exemplary embodiment, the plural middle binding portions 60 are established to be spaced apart in the length direction of the bag body 52. Of these middle binding portions 60, the middle binding portions 60 that are adjacent to one another in the length direction of the bag body 52 are formed to be offset in the width direction of the bag body 52. The middle binding portions 60 are portions at which the double cloth is formed into a single cloth by a binding thread; these portions tend to be thicker than other portions. However, in the present exemplary embodiment, because the middle binding portions 60 that are adjacent in the length direction of the bag body 52 are formed to be offset in the width direction of the bag body 52, these portions that are thicker than other portions of the bag body 52 are dispersed in the width direction of the bag body 52. Therefore, when the webbing assembly 12 is taken up onto the spool 26 of the webbing take-up device 14, a thickness of the webbing assembly 12 in the diametric direction of the spool 26 is consistent over the width direction. Consequently, the webbing assembly 12 may be easily pulled out from and easily taken up onto the spool 26.

In the exemplary embodiments described above, the bag body 52 is formed of a double cloth. However, the structure of the bag body 52 is not limited to this mode. For example, a bag body may be formed by sewing together two sheet members, or a bag body may be formed by molding a synthetic resin material into a bag shape; structures other than structures based on a double cloth may broadly be employed for the bag body.

In these exemplary embodiments, the middle binding portions 60 are formed to serve as joined portions by the double cloth being locally formed into a single cloth by a binding thread. However, the structure of the joined portions is not limited to this mode. For example, fastening members such as rivets or the like may locally join together the first layer 54 and second layer 56 to structure the joined portions, the first layer 54 and second layer 56 may be locally fixed together by adhesive, thermal welding or the like to form the joined portions in those regions, various modes may be broadly employed as structures of the joined portions.

In these exemplary embodiments, the bag body 52 is fixed to the webbing 42 by stitching with the stitching thread 62. However, a structure for fixing the bag body 52 to the webbing 42 is not limited to this mode. For example, the bag body 52 may be fixed to the webbing 42 by binding members such as rivets or the like, or the bag body 52 may be fixed to the webbing 42 by an adhesive, thermal welding or the like; various modes may be broadly employed as the structure for fixing the bag body 52 to the webbing 42.

In these exemplary embodiments, the fixed portions of the bag body 52 to the webbing 42 are established at the middle binding portions 60. However, the fixed portions of the bag body 52 to the webbing 42 may be established at locations that are different from the middle binding portions 60.

In these exemplary embodiments, the bag body 52 is provided at the thickness direction one side of the webbing 42. However, the bag body 52 may be provided at the thickness direction other side of the webbing 42, or to either side in the width direction of the webbing 42.

The disclosures of Japanese Patent Application No. 2013-220503 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

The invention claimed is:

1. A seatbelt device comprising:
a webbing configured to be applied to a body of a vehicle occupant; and
a bag body including a first layer at a side of a bag body at which the webbing is disposed and a second layer at an opposite side of the bag body from the webbing, the first layer being disposed between the webbing and the second layer,
wherein the bag body is provided along a length direction of the webbing,
the bag body is fixed to one side of a thickness direction of the webbing and is supported by the webbing,
the bag body is disposed between the webbing and the body of the vehicle occupant in a state in which the webbing is applied to the body of the vehicle occupant,
the bag body is inflated by a fluid being supplied thereinside,
a plurality of discrete, spaced apart joined portions, at which the first layer and the second layer are locally joined together, is formed in the bag body,
inflation of the bag body is controlled by the joined portions, and
wherein a plurality of discrete, spaced apart fixed portions of the bag body to the webbing are established at the joined portions, the inflating fluid can flow between the joined portions substantially without resistance to uniformly inflate the bag body and the joined portions are leak proof with respect to the inflating fluid and configured not to be inflated by the fluid.

2. The seatbelt device according to claim 1, wherein the plurality of the joined portions are established to be spaced apart in a length direction of the bag body and offset in a width direction of the bag body.

3. The seatbelt device according to claim 1, wherein the plurality of joined portion are provided at a substantially central portion in a width direction of the bag body.

4. The seatbelt device according to claim 1, wherein the plurality of discrete, spaced apart fixed portions disposed adjacent to one another are established to be spaced apart in a length direction of the bag body and offset in a width direction of the bag body.

* * * * *